Nov. 10, 1953　　　A. G. F. WALLGREN　　　2,658,807
DOUBLE ROW ROLLER BEARING
Filed Aug. 14, 1950　　　　　　　　　　　3 Sheets-Sheet 1
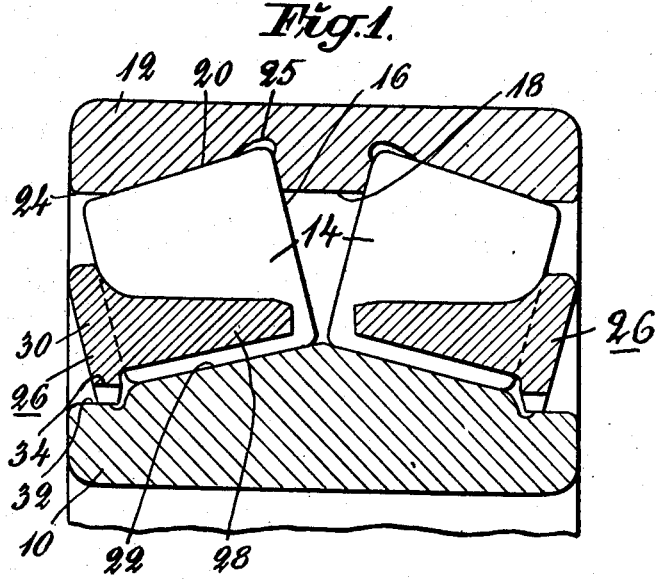
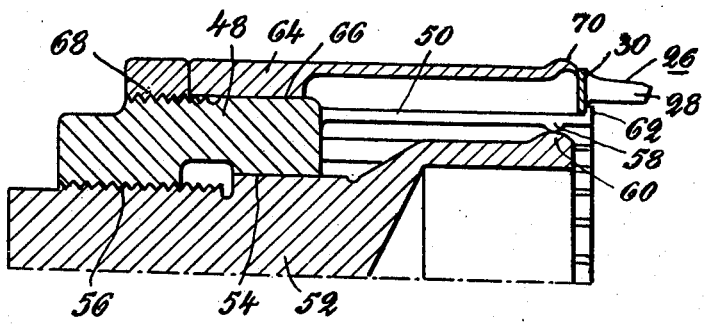

Nov. 10, 1953
A. G. F. WALLGREN
2,658,807
DOUBLE ROW ROLLER BEARING
Filed Aug. 14, 1950
3 Sheets-Sheet 2
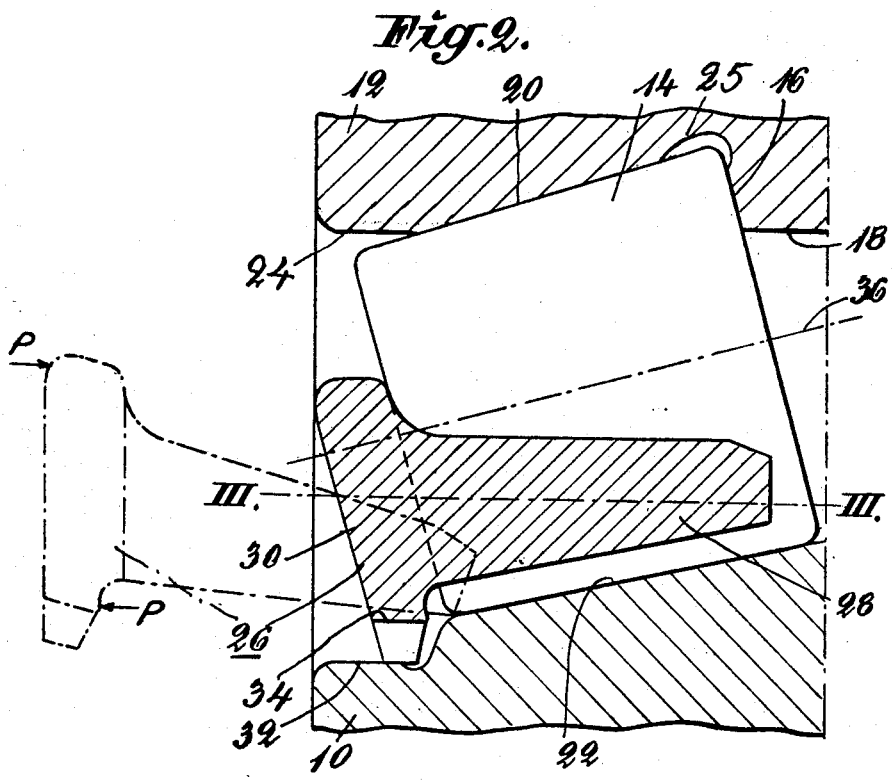
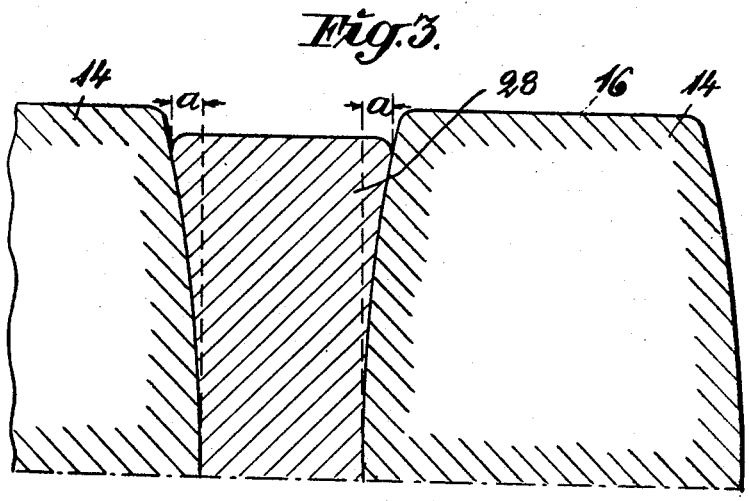

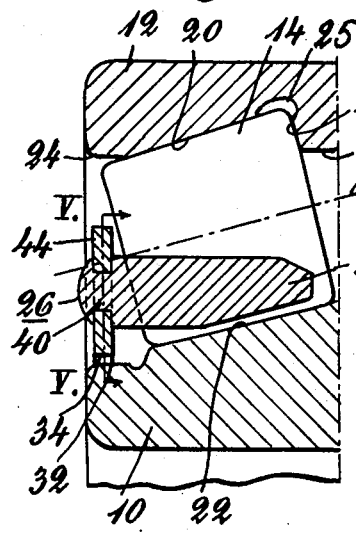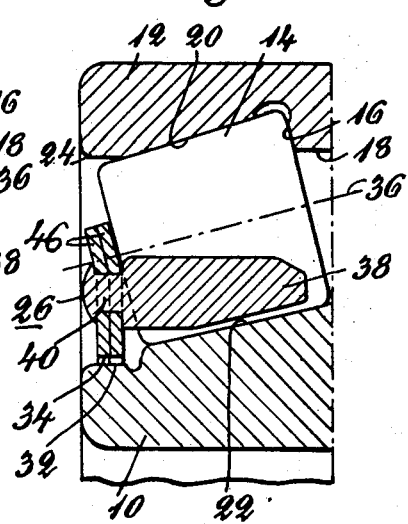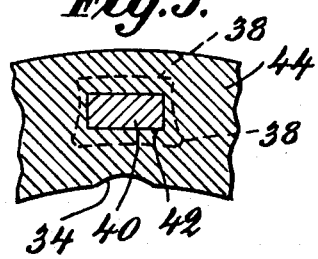

Patented Nov. 10, 1953

2,658,807

UNITED STATES PATENT OFFICE 2,658,807

DOUBLE ROW ROLLER BEARING

August Gunnar Ferdinand Wallgren, Stockholm, Sweden

Application August 14, 1950, Serial No. 179,212
Claims priority, application Sweden August 15, 1949

5 Claims. (Cl. 308—214)

This invention relates to double row roller bearings comprising an outer and an inner annular bearing member with interposed rollers, the diameter of which rollers varies along their length and the longitudinal axis of which is inclined to the longitudinal axis of the bearing, said rollers being axially fixed in both directions by means of races and by means of guiding surfaces on the bearing members.

In order that double row roller bearings so constructed shall permit of being made up into commercial units ready for mounting on a shaft or in a bearing housing, the bearings have been equipped, as described in my U. S. Patent No. 2,489,342, granted November 29, 1949, with retainers ensuring the mutual peripheral position of the rollers, and comprising separating members arranged between the rollers and of a retainer ring uniting said separating members solely on the outer faces of the bearing. The separating members are designed with a portion in the interior of the bearing of a width greater than that of a portion located nearer to the outer face of the bearing, viewed in the axial direction. A reciprocal action is provided between the individual parts of the roller retainer and the rollers, in that the roller retainer ensures the mutual position of the rollers, while the latter prevent removal of the roller retainer from the bearing. As described in my prior patent, the separating members and the retainer ring are constructed for this purpose as separate elements, which are united only after the separating members have been introduced between the rollers.

The main object of this invention is to provide an improved construction of the roller retainer which will permit mounting of the same in the bearing even when the separating member and the annular retaining member are preformed as an integral unit, thus simplifying the mounting of the bearing.

Further objects and advantages of the invention will be apparent from the following description considered in connection with the accompanying drawings, which form a part of this specification, and of which:

Fig. 1 is a longitudinal sectional view of a part of a double row roller bearing constructed according to the invention.

Fig. 2 shows a portion of the bearing in the same section as in Fig. 1 but on a larger scale.

Fig. 3 shows two rollers with an intermediate separating member in a section taken on a cylinder with the generatrix III—III in Fig. 2 parallel to the axis of the bearing, said section being shown as developed in a plane.

Fig. 4 is a longitudinal sectional view of a somewhat modified embodiment of the invention.

Fig. 5 is a sectional view of the roller retainer taken on the line V—V of Fig. 4.

Fig. 6 is a longitudinal sectional view of a bearing according to a further modification of the invention.

Fig. 7 is a longitudinal sectional view of a tool for assembling the roller retainer in the bearing.

Referring to the drawings, 10 designates the inner ring of the bearing and 12 the outer ring thereof, said rings being made as undivided units circumferentially and preferably also in the axial direction, so that each of them is thus formed by a single integral element. Inserted between the two rings are two rows of conical or substantially conical rollers 14. These are caused to bear at their large ends with end surfaces 16, preferably formed slightly convex and spherical in known manner, against a central annular flange 18 of the outer ring 12. The latter is provided with two roller races 20 of conical or approximately conical shape, the diameter of which increases inwardly toward the centre of the outer ring.

Similarly the inner ring 10 is provided with two conical or approximately conical roller races 22, one for each row of rollers, the diameter of which increases inwardly toward the centre of the ring. The roller races 20, 22 for one row of rollers and the conical surfaces of the rollers converge so as to form a portion of the outer surfaces of cones having their apices meeting in a common point disposed on the axis of the bearing, and located on the same side relative to the centre of the bearing as the row of rollers under consideration. It will be understood from the above that the location of the rollers 14 is axially fixed in both directions.

To permit mounting of the desired number of rollers, the outer bearing ring is subjected to an elastic deformation, with the inner ring arranged eccentrically in the outer ring. In some types of bearing, the races 20 may terminate at some distance from the outer end surfaces of the rollers by a corresponding removal of material from the outer ring 12, as indicated at 24. This facilitates the introduction of rollers into the bearing in the requisite number, inasmuch as the outer ring 12, thus rendered thinner, can be deformed to a greater degree. As the flange 18 is made integral with the outer ring 12, it is provided with a clearance 25 for the grinding wheel, the magnitude of said clearance being such that the contact line of the rollers against the outer ring provides substantially the same stresses as against the inner ring 10, and that the contact line is located substantially symmetrically lengthwise of the roller.

The relative position of the rollers 14 is ensured by means of a roller retainer for each row of rollers, denoted generally by 26. In the embodiment shown in Figs. 1 to 3, each roller retainer consists of separating members 28 introduced between the rollers and of a closed ring or annulus 30, the said parts being made integral. The retainer ring 30 has a greater dimension in the radial than in the axial direction, and its inner peripheral portion is preferably extended so that the ring 30 is centered by a surface 32 on the inner ring 10. A number of inlet openings 34 distributed round the circumference may be provided at the inner peripheral portion of the retainer ring for the introduction of lubricant.

In the assembled bearing, the separating members 28 are located in spaced relation with the race 22 of the inner ring, and are also for the major part located radially inwardly of the centre line of the rollers 14. Within this zone the space intermediate the rollers widens in the axial direction from the retainer ring 30 towards the middle of the bearing in cylindrical sections taken through the central axis of the bearing, as will be clear from Fig. 3, in which the enlargement is designated by $a$ for each roller. The space intermediate two rollers widens in sections concentric with the cylindrical section III—III in a direction from the centre line 36 towards the inner ring 10 and, the enlargement $a$ increases in the same direction. It will be understood that, if the separating members 28 are of a shape fitting into the space intermediate the rollers as described above, the roller retainer 26 when assembled in its position in the bearing cannot be removed from the bearing during operation thereof. At their portion adjacent the retainer ring 30 the separating members may project towards the centre line 36 but then extend radially inwardly therefrom, as the separating members are located further into the bearing.

On the other hand, the roller retainer 26 cannot be introduced between the rollers 14 when having the shape above described. It has, however, been found possible to form the roller retainer so that on being elastically deformed it can be assembled in the bearing, after which it serves its purpose in an entirely satisfactory manner. To this end the retainer ring 30 is made from a material permitting tilting of the ring into the position shown by chain-dotted lines in Fig. 2, without exceeding the elastic limit of the material. This tilting is produced by subjecting the retainer ring 30 to forces acting in the direction of the arrows P at the outer and inner portions thereof around the circumference. In this process the separating members 28 are swung inwardly until their free ends come approximately opposite the outer end of the race 22, as shown in Fig. 2. When the free ends of the separating members are introduced between the rollers, the moment acting according to the arrows P is then reduced, the retainer ring returning to its initial shape as shown in full lines in Fig. 2. As will be clear from the above, this introduction of the separating members 28 from the radially inner side of the rollers is rendered possible through the particular shape of the intermediate space between the rollers. In the assembled position, the separating members contact with sliding clearance the outer surface of the rollers.

If the ring retainer is made integral in the manner shown in Fig. 1, it should consist of a material having a high elastic limit, such as a bronze alloy. However, the separating members 28 and the retainer ring 30 may individually be made from different materials, the former consisting, for instance, of bearing bronze, while the retainer ring is made from steel plate. In the embodiment shown in Figs. 4 and 5, the separating members 38 are constructed at the outer ends thereof in the form of pins 40 received in openings 42 in the retainer ring 44 on the outer face of which the pins may be riveted over. To prevent turning of the separating members 38 due to the frictional moment arising from the rollers acting thereon, the apertures 42 may be formed of non-circular shape. For example, they may be made rectangular with their maximum dimensions in the peripheral direction as shown in Fig. 5.

As shown in Fig. 6, the retainer ring may consist of sheet-metal rings 46 arranged face to face so that the stress produced when the separating members 38 are positioned obliquely in the mounting operation becomes particularly low. In this case the retainer ring may consist of comparatively soft sheet-iron, which ensures at the same time the requisite elastic deformation and the strength of the retainer.

It will be found that the strains to which the individual parts of the retainer ring are subjected during operation of the bearing due to centrifugal force and through irregularities in the operation of the rollers on account of unavoidable differences in dimensions will amount only to quite negligible values even under the severest conditions.

The tool shown in Fig. 7 comprises a sleeve or the like 48, provided with fingers 50, which are comparatively long in the axial direction and are arranged in the form of an annulus. Normally, these fingers are slightly inclined inwardly toward the centre of the tool, but they may be forced outwardly by means of an element 52, which is guided in the sleeve 48 on a surface 54, said element being in threaded connection with the sleeve, as indicated at 56. When the element 52 is screwed into the sleeve 48, the fingers 50 and projections 58 thereon are forced outwardly by the enlarged end portion 60 of the sleeve 52, so that abutments 62 on said fingers engage behind the inner edge of the ring retainer disc 30 (44 and 46), and hold this edge in position. When an outer sleeve 64, provided with a guide surface 66 against the outer face of the sleeve 48 is displaced by means of a nut 68, its edge 70 bears against the outer periphery of the retainer ring 30, and the ring will be subjected to the forces P according to Fig. 2 and will be tilted into the form necessary for the mounting operation.

After the separating members 28 or 38 have been inserted between the rollers, the turning moment is released, as stated above, by the outer sleeve 64 being moved to the left in Fig. 7, the separating members thus being caused to swing back in an outward direction. Finally, the element 52 is displaced axially, so that the fingers 50 may move inwardly due to their resiliency, until their abutments 62 are clear of the retainer ring 30. Through this radial movement of the fingers 50 only the small axial space occupied by the abutments 62 is required for the tool during the assembling process.

While several more or less specific embodiments of the invention have been shown, it is to be understood that this is for purpose of illustration only, and the invention is not to be limited thereby, but its scope is to be determined by the appended claims.

What I claim is:

1. A double row roller bearing comprising an outer and an inner annular bearing member with interposed rollers having their diameters varying along their length, and their longitudinal axes inclined to the longitudinal axis of the bearing, said rollers being axially fixed in both directions by means of races and by means of guide surfaces on the bearing members, and the rollers being maintained distributed around the circumference by means of a roller retainer for each row of rollers, in which the roller retainer consists of separating members, having when viewed in the axial direction, a width increasing inwardly of the bearing and conforming to the shape of the intermediate space between the rollers on one side of their central axis and an annular retainer ring connected to the separating members only at the outer face of the bearing, the roller retainer being formed as an integral unit with the separating members introduced between the rollers on assembly of the bearing due to elastic deformation of the retainer ring.

2. A double row roller bearing according to claim 1, in which the retainer ring is centered on a surface formed on one or the other bearing member.

3. A double row roller bearing according to claim 1, in which the separating members and the retainer ring are integral.

4. A double row roller bearing according to claim 1, in which the separating members and the retainer ring are made as separate elements, which are combined into said integral unit prior to assembly of the bearing.

5. A double row roller bearing to claim 4, in which the retainer ring consists of a plurality of ring elements located face to face.

AUGUST GUNNAR FERDINAND WALLGREN.

References Cited in the file of this patent

UNITED STATES PATENTS

| Number | Name | Date |
|---|---|---|
| 1,419,520 | Rockwell | June 13, 1922 |
| 1,517,574 | Morrison | Dec. 2, 1924 |
| 1,941,460 | Boden | Jan. 2, 1934 |
| 2,042,417 | Wise | May 26, 1936 |